E. S. COLE.
RECORDING AND MEASURING DEVICE.
APPLICATION FILED APR. 5, 1910.
1,236,911.
Patented Aug. 14, 1917.
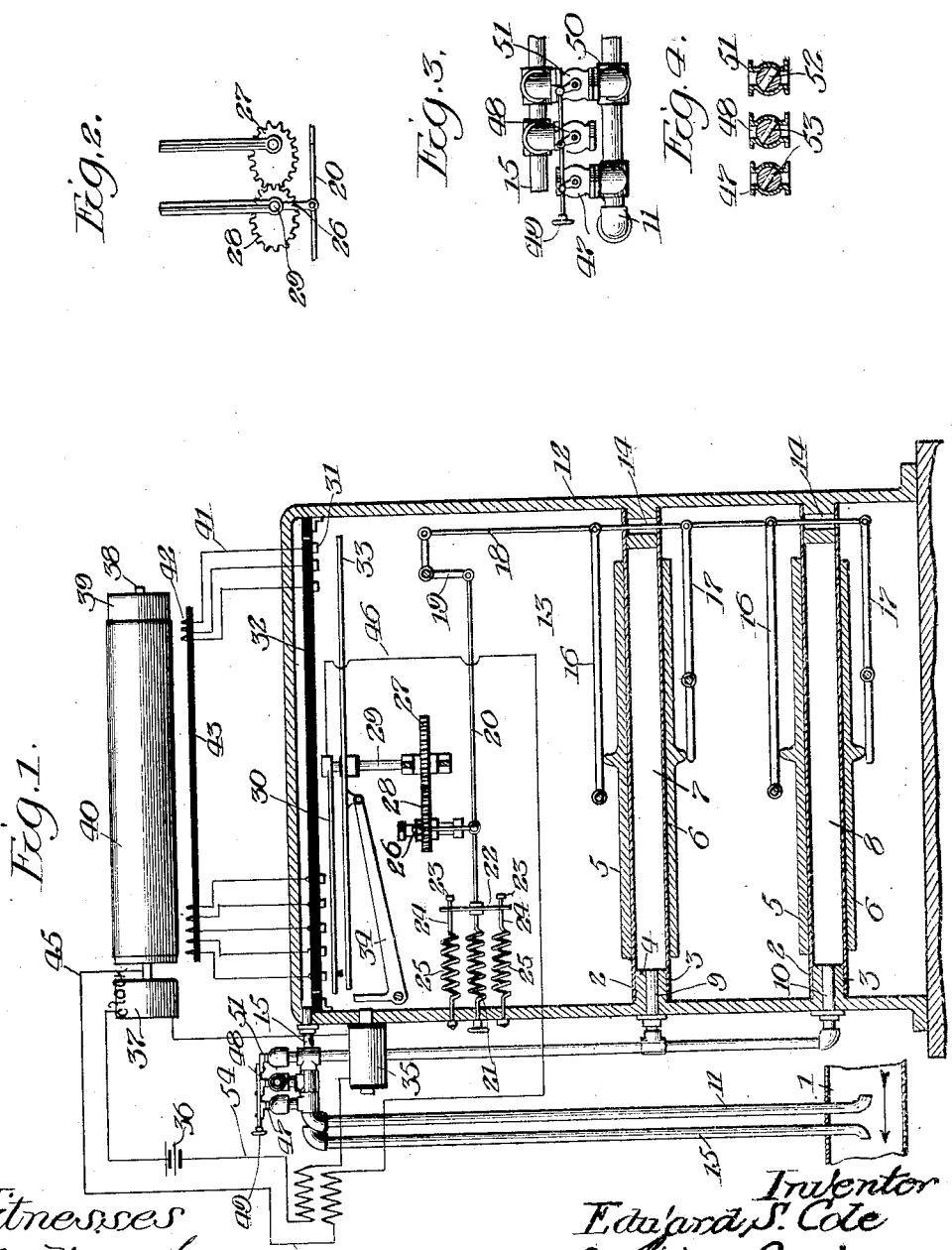
Witnesses
Inventor
Edward S. Cole

UNITED STATES PATENT OFFICE.

EDWARD S. COLE, OF UPPER MONTCLAIR, NEW JERSEY.

RECORDING AND MEASURING DEVICE.

1,236,911.      Specification of Letters Patent.      Patented Aug. 14, 1917.

Application filed April 5, 1910. Serial No. 553,569.

*To all whom it may concern:*

Be it known that I, EDWARD S. COLE, a citizen of the United States, residing at Upper Montclair, in the county of Essex and State of New Jersey, have invented a certain new and useful Improvement in Recording and Measuring Devices, of which the following is a full, clear, concise, and exact description, reference being had to the accompanying drawings, forming a part of this specification.

My invention relates to measuring and recording devices and is more particularly designed for use in connection with measuring devices applied to the measurement of the velocity of flowing streams or the like. In my Patent No. 1,053,086, issued Feb. 11, 1913, on an application filed of even date herewith, I set forth a measuring apparatus which I prefer to call a pitometer, and in which a single diaphragm is used to actuate recording mechanism similar in general details to the recording mechanism set forth in my present application.

In this, my present application, however, while I use the recording apparatus and safety apparatus conforming in general design to that shown in my said patent in which said devices are claimed more broadly, I provide a new and novel measuring system in that, I use multiple diaphragms to measure the differences in dynamic and static pressure of a flowing stream when my invention is applied to the measurement of the velocity of flowing streams.

I find that the cumulative effect of multiple diaphragms serves to give me an accuracy in the reading of the device which I hitherto have been unable to obtain with other devices.

I will describe my invention more in detail by reference to the accompanying drawing, illustrating one embodiment thereof in which:

Figure 1 is a side view partly in section of my improved measuring and recording device, circuit arrangements being indicated diagrammatically.

Fig. 2 is a detail view of the transmission mechanism, and;

Figs. 3 and 4 are details of the protector mechanism used in the operation of the device.

Referring more particularly to Fig. 1, I show a pipe or tunnel 1 through which water is flowing and whose velocity it is desired to measure. I may state right here that in the description of this invention, I describe it specifically as applied to the measuring of the velocity of a flowing stream, but it will be apparent that the invention is readily adapted to a great variety of other uses and I do not mean to be understood as limiting myself to the specific form in which I have shown my invention herein.

The velocity of the flowing stream is measured by my improved pitometer construction, which consists in the preferred form in the use of multiple diaphragms. I have shown two sets of multiple diaphragms herein, each set consisting of two diaphragms 2 and 3 suitably fastened to a ring 4 in such manner that the two diaphragms inclose the space between them. The diaphragms carry respectively stiffening disks 5 and 6.

As before stated I have shown two sets of such multiple diaphragms and to distinguish between them I designate the cylindrical space or chamber inclosed by one set by the numeral 7 and the cylindrical space inclosed by the other set by the numeral 8. These inclosed diaphragm chambers communicate by means of tubes 9 and 10 with a tube 11 which enters the pipe 1 and faces up stream, thus responsive to the dynamic pressure of the flowing stream. These multiple diaphragm chambers are mounted within a casing 12 which is entirely inclosed, thus adapted to maintain pressure therein, and which casing 12 has its interior 13 communicative throughout the space between the sets of multiple diaphragms, having communicating ducts 14 as illustrated.

This chamber 13 which incloses all the space around the outside of the diaphragms, which is under the same pressure throughout, communicates through the tube or pipe 15 with the interior of the pipe 1 and faces down stream, thus to record the static pressure of the flowing stream. With these two readings, by properly proportioning the recording device, I can obtain the velocity of the flowing stream.

It will be observed, of course. that the pressure in the diaphragm chambers 7 and 8 is in excess of the pressure within the chamber 13, consequently the diaphragms bulge outwardly and this movement of the diaphragms is communicated by a series of levers, the two similar levers 16, 16 and another set of levers 17, 17 to the link 18, which link is pivotally secured to a bell crank lever 19 and exerts a pull upon the link 20.

The link 20 is restrained in its movement by spring 21 and the link likewise carries a crosshead 22, which when said link has been moved a predetermined distance to the right, engages heads 23, 23 mounted upon stems 24, 24, thus further causing the movement of the link 20 to be restrained by picking up the additional springs 25. The stems 24, of course, slide loosely through the crossbar 22.

In this way I obtain a reading throughout a larger scale. I give a very accurate reading by having a large movement of the pointer for the initial differences in pressure, but when these are exceeded and it is still desired to get a reading, a smaller movement of the pointer takes place from the same unit change in pressure on account of the increased spring action.

The link 20, as shown more clearly in Fig. 2 is secured by means of an additional link 26, to an elliptical gear 28 which meshes with a corresponding elliptical gear 27. This use of the elliptical gears likewise gives a smaller movement of the pointer as I apply the higher differences of pressure, thus to increase the scale over which the instrument is usable. The movement of the link 20 therefore, through the interposition of the gears 27 and 28 rotates the shaft 29, which shaft carries a pointer 30.

The pointer 30 moves around a circular bank of electrical contacts 31 mounted upon an insulating ring 32. The pointer 30 is not in engagement with the contacts 31 except periodically as it is actuated by a cylindrical plate or ring 33, loosely mounted upon the shaft 29, and moved against said pointer 30 to bring it into engagement with whichever contact 31 it happens to be over, through the movement of the bellcrank lever 34 acting under the influence of the magnet 35.

This magnet 35 is periodically actuated by reason of the battery 36 and the clock work 37, the details of which clock work it is not thought necessary to set forth. The clock work likewise drives a shaft 38 carrying a metallic drum 39 upon which is mounted a strip of paper 40. The contacts 31 are connected respectively by means of conductors 41 to the spark points 42, mounted in a strip of insulation 43.

A primary winding 54 is provided serially with the magnet 35 and this primary winding is associated with a secondary winding 44. Whenever the magnet 35 is actuated, an inductive impulse is established in the secondary winding and this secondary winding therefore, by having a conductor 45 connected to the shaft 38 and a conductor 46 connected to the shaft 29, causes a spark to jump from that contact 42 which is associated with that particular contact 31 with which the arm 30 is pressed into engagement by the plate 33.

The spark jumping to the metallic drum 39 thereby punctures the paper and gives a record at stated intervals of the positions occupied by the pointer 30. It will be seen from this that the pointer 30 moves practically around a frictionless path.

In order to safeguard the device, I provide protective means illustrated more in detail in Figs. 3 and 4. It will be understood, of course, that the diaphragms used and the other operating mechanisms are rather delicate and that the full pressure of either tube 11 or 15 supplied to the chambers 7 and 8 without the corresponding pressure of the other tube being supplied to the chamber 13, or vice versa, would cause a rupture of the delicate mechanism. Therefore I provide blow-off valves respectively 47 and 48 for the tubes 11 and 15, which blow-off valves are conjointly operated by a single handle 49, so that the blow-off valves may be operated at the same time to open said tubes 11 and 15 to the atmosphere to blow out the air, and then to close said valves so that the pressure may be supplied to the device proper.

In this manipulation therefore, it is absolutely necessary that the two valves 47 and 48 are opened in unison. To overcome any inequalities in the opening of said valves and to provide a further safeguard, or protection against rupture of the apparatus, I utilize a by-pass tube 50 having a valve 51, which valve is likewise actuated by the handle 49. The valve 51 however has a larger central opening 52 than the central openings 53 of the valves 47 and 48 so that said valve 51 opens slightly in advance and closes slightly later than the valves 47 and 48, thus to provide a short path for the liquid between the tubes 11 and 15 until the valves 47 and 48 are permanently in their proper positions.

While I have herein shown and particularly described one embodiment of my invention, I do not, of course, mean to limit myself to the precise construction and arrangement as herein set forth, but having thus described my invention, what I claim as new and desire to secure by Letters Patent is:

1. A device of the class specified comprising in combination, sources of unlike fluid pressure, a pressure chamber for one of said sources, said chamber being provided with a plurality of diaphragms, means responsive to and operated by all of said diaphragms, and a second pressure chamber for the other source.

2. A device of the class specified comprising in combination, sources of unlike fluid pressure, a pressure chamber for one of said sources, said chamber being provided with a plurality of diaphragms, means responsive to and operated by all of said diaphragms, and a second pressure chamber for the other source, the plurality of diaphragms for said first chamber being subject also to pressure in said second mentioned chamber.

3. A device of the class specified comprising in combination, sources of unlike fluid pressure, a pressure chamber for one of said sources, said chamber being provided with a plurality of diaphragms all arranged to bulge outwardly, and a second pressure chamber for the other source, said second pressure chamber having similarly constructed diaphragms and means responsive to and operated by the diaphragms of both of said pressure chambers.

4. A device of the character described having a closed pressure chamber, a plurality of diaphragms forming part of the inclosure for said chamber, a closed chamber inclosing said pressure chamber, sources of unequal fluid pressure, means for communicating said sources with said chambers, and means responsive to the movements of said plurality of diaphragms.

5. A device of the character described having a closed pressure chamber, a plurality of diaphragms forming opposite sides of the inclosure for said chamber, a closed chamber inclosing said pressure chamber, sources of unequal fluid pressure, means for communicating said sources with said chambers, an arm responsive to the movements of said diaphragms, and means interposed between said arm and said diaphragms whereby the said diaphragms all act on said indicator to move it in the same direction.

6. A device of the class described comprising in combination a pressure chamber provided with oppositely disposed movable walls or members, two sets of mechanisms coöperating with said walls, one of said sets coöperating with one wall and the other set coöperating with the other wall, an arm, and connections running from said arm to both of said sets of mechanism for operating said arm from said diaphragms.

7. In a device of the class described in combination, a pressure chamber including two oppositely disposed movable diaphragms, and two operating levers coöperating with said diaphragms one lever with each diaphragm, and an operating bar or rod connecting two ends of said levers, said levers being pivoted on opposite sides of the centers of said diaphragms and having only contact connection or engagement therewith.

8. In a device of the class described in combination, a plurality of pressure chambers each including two oppositely disposed diaphragms, a lever coöperating with each of said diaphragms and contacting therewith approximately at its center, the two levers coöperating with the two diaphragms of a given chamber being pivoted on opposite sides of the center of the chamber, and a single operating bar or rod connected to the ends of all of said levers.

In witness whereof I hereunto subscribe my name this 25th day of March, A. D. 1910.

EDWARD S. COLE.

Witnesses:
MAX W. ZABEL,
HAZEL JONES.

Copies of this patent may be obtained for five cents each, by addressing the "Commissioner of Patents, Washington, D. C."